United States Patent

Lazarus

[11] 3,885,209
[45] May 20, 1975

[54] TWO SPEED CONTROL SYSTEMS

[75] Inventor: Howard Lazarus, Syosset, N.Y.

[73] Assignee: Astrosystems, Inc., Lake Success, N.Y.

[22] Filed: Dec. 27, 1973

[21] Appl. No.: 428,772

[52] U.S. Cl. ............... 318/692; 336/123; 318/690
[51] Int. Cl. ............................................ G05b 11/12
[58] Field of Search ........... 318/595, 661, 656, 659, 318/660, 592, 593, 49, 50, 12, 15, 654, 690, 692; 336/122, 123

[56] References Cited
UNITED STATES PATENTS

| 2,807,763 | 9/1957 | Corbett et al. | 318/592 |
| 2,950,427 | 8/1960 | Tripp | 318/661 X |
| 3,100,859 | 8/1963 | Bentkowsky | 318/595 |
| 3,135,902 | 6/1964 | Uhrig | 318/595 |
| 3,396,321 | 8/1968 | Pellecchia | 318/595 |

*Primary Examiner*—B. Dobeck
*Attorney, Agent, or Firm*—Stevens, Davis, Miller & Mosher

[57] ABSTRACT

Two speed control apparatus including first and second rotatable shafts coupled to each other through a single mesh of gears, and first and second transducers connected to the respective shafts. The transducers are electrically coupled in cascade to enable the first to provide a "fine" indication of the angular position of the first shaft, while the second provides a "coarse" indication of the number of revolutions of the same first shaft. The transducers include either a set of resolvers or a synchro transmitter and differential.

7 Claims, 3 Drawing Figures

TWO SPEED CONTROL SYSTEMS

BACKGROUND OF THE INVENTION

This invention relates to two-speed control systems and, more particularly, to apparatus for generating two-speed position signals for determining the position of a rotatable shaft.

There are many applications which require the generation of a precise indication of the angular position of a rotatable shaft. Transducers including an electromagnetic induction-type resolver, or a synchro transmitter and synchro differential, both of which are vector resolvers, are well suited for such applications. For example, in an electromagnetic induction-type resolver, which may have a stator winding and a pair of orthogonal rotor windings coupled to the shaft, the resolved vector is defined by the stator excitation voltage and the angle between the stator and the rotor which is driven by the shaft. This vector is resolved into two components along the axes of the two rotor windings to give an indication of the shaft position angle.

In one practical application, the rotatable shaft may be connected to a machine tool which is driven linearly. In this manner, the angular position of the rotor with respect to the stator will provide, via the outputs of the rotor windings, and indication of the amount of travel of the tool. For example, the system may be constructed such that for every one revolution of the shaft, the tool travels linearly 1 inch.

When precision machining is necessary, it is important to know the exact amount of movement of the tool. This may be accomplished by resolving the angular position of the shaft to a predetermined degree. For accurate machining, it is not uncommon to require resolution of the amount of movement of the tool to the nearest thousandth of an inch.

In a standard, two-speed gear train the angular position of the shaft is resolved by gearing two transducers together at the total ratio desired. In order to resolve the travel of the tool to the nearest one thousandth inch with the prior art devices a gear train including six gears and three meshes would be required, as shown, for example, in U.S. Pat. No. 2,735,971. This is because practical precision gears limit the ratio per mesh to 6:1. Consequently, such a system is expensive and requires a relatively large space due to the need for six precision gears and their associated mechanical supports and bearings.

The present invention overcomes all of the above-noted disadvantages of two-speed control systems. With the present invention, linear movement of the tool may be resolved to 0.001 inch but with a fewer number of gears. Therefore, not only is the system cost reduced due to the need for a fewer number of precision gears, as well as their associated mounts and bearings, but less space is required.

SUMMARY OF THE INVENTION

In accordance with the invention, a single mesh of two gears is used to resolve the linear movement of an element to the degree required. First and second electromagnetic transducers are coupled to first and second gears, respectively, via rotatable shafts. The electromagnetic transducers are electrically coupled to one another in a particular manner so that the output of one transducer provides a coarse indication while the output of the other transducer provides "fine" information of tool travel.

In one embodiment, the electromagnetic transducers comprise first and second resolvers. The first resolver has first and second input or stator windings and first and second output or rotor windings connected to a first shaft and movable with respect to the input windings. A voltage generator provides an excitation voltage to one of the stator windings while the other input winding is shorted and connected to ground.

THe second resolver comprises first and second input or stator windings electrically coupled to the first and second output or rotor windings, respectively, of the first resolver. In addition, the second resolver includes first and second output or rotor windings that are movable with respect to the stator windings of the second resolver and are connected to a second shaft geared to the first shaft.

The first and second input windings of each resolver are in space quadrature with each other as are the first and second output windings of each resolver. As will be more fully discussed below, the outputs of the resolvers provide information as to tool movement to, for example, 0.001 inch.

In a second embodiment, the transducers comprise a synchro transmitter and synchro differential which correspond, respectively, to the first and second resolvers. THe synchro transducers also have their stator windings connected to each other in such a manner that the output of the transmitter provides a fine signal while the output of the differential gives a coarse signal.

Figure 1:
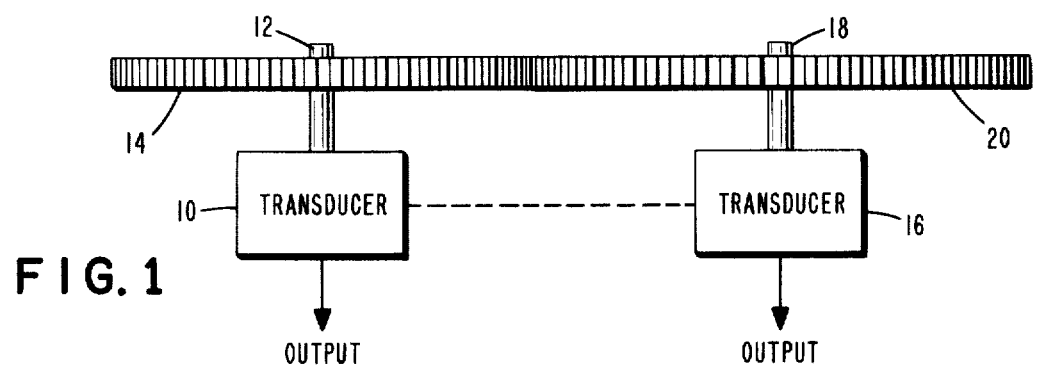
FIG. 1 is a block diagram of the present invention.

DETAILED DESCRIPTION OF THE INVENTION:

In FIG. 1 there is shown a first transducer 10 connected to a first shaft 12 having a first gear 14 connected to rotate with the shaft. A second transducer 16 is connected to a second shaft 18 which has a second gear 20 coupled to rotate with this shaft. Gears 14 and 20 mesh with each other to provide a singlemesh gearing while transducers 10 and 16 are electrically coupled together, as shown schematically by the dash line. As will be more fully discussed below, by the selection of a particular gear ratio and electrical interconnection of the transducers, the linear movement of a tool, coupled to first shaft 12, is resolved to the precision required. Such resolution is obtained from information provided by the outputs of transducers 10 and 16.

Figure 2:
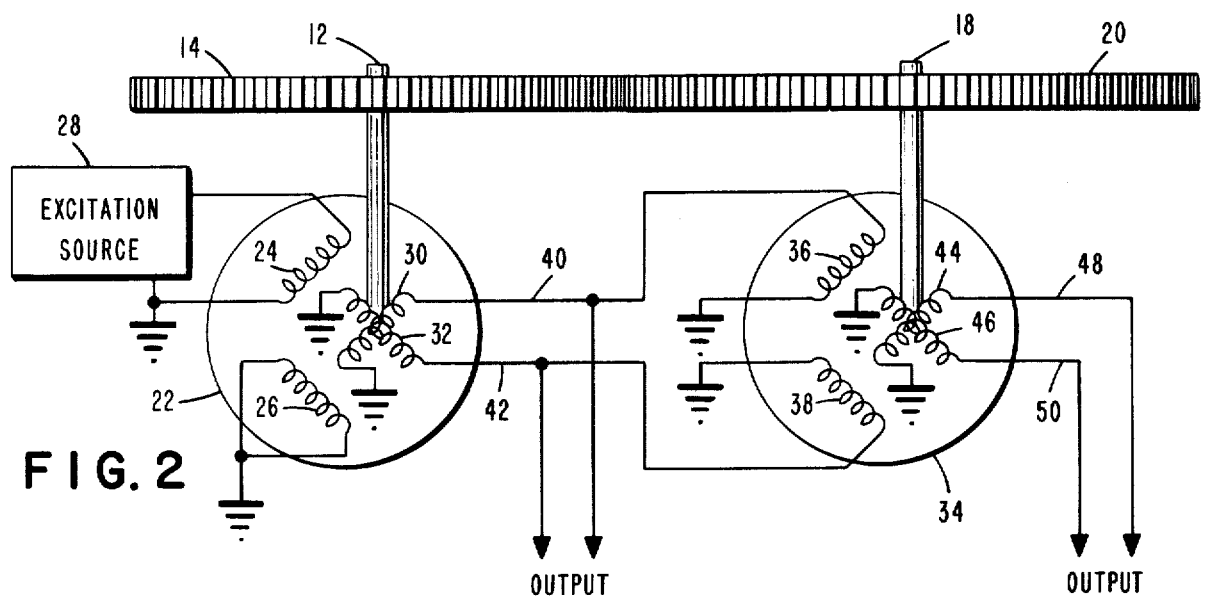
FIG. 2 shows a schematic of the present invention employing resolver transducers.

FIG. 2 shows a pair of resolvers which may be used as the transducers of FIG. 1. A resolver 22 includes input or stator windings 24 and 26 which are in space quadrature with respect to each other. THe stator winding 24 is coupled to an excitation source 28 while stator winding 26 is shorted and grounded. Excitation source 28 is a single phase AC source providing an input reference voltage of amplitude E to stator winding 24.

Resolver 22 also includes two output or rotor windings 30, 32 in space quadrature with each other. Rotor windings 30, 32 are mechanically coupled to the first shaft 12.

A second resolver 34 includes a pair of stator windings 36, 38 in space quadrature with each other. Stator windings 36, 38 are electrically coupled, via lines 40, 42, and ground, to rotors 30, 32, respectively, of resolver 22. The voltage outputs of rotor windings 30, 32 are, therefore, the excitation voltages provided to the stator windings 36, 38 of resolver 34; that is, the resolvers 22, 34 are connected in cascade. Resolver 34 also comprises a pair of rotor windings 44, 46, in space quadrature with each other, and mechanically coupled to the second shaft 18.

With the structure shown in FIG. 2, tool travel may be resolved to the precision required depending on the gear ratio used. As will be discussed, if the gear ratio of gear 14 to gear 20 is 99:100, then the voltage output from lines 48 to 50 of resolver 34 may provide information of a coarse setting to the nearest 0.1 inch of tool travel, while the voltage output from lines 40 and 42 will indicate a fine setting to the nearest 0.001 inch.

Rotation of the first shaft 12 causes a shift of rotors 30, 32 and a corresponding shift of the magnetic fields induced therein by stator winding 24. As the stator windings 36, 38 are electrically coupled to rotor windings 30, 32, the former will reproduce the magnetic fields in windings 30, 32. Since rotor windings 44, 46 are mechanically coupled to the second shaft 18, which is geared to the first shaft 12, voltages will be induced in windings 44, 46 which are indicative of the difference between the angular displacements of the first and second shafts. In this specific embodiment in which the gear ratio of gear 14 to 20 is less than 1, the coarse unit including shaft 18 and rotor windings 44, 46 rotates more slowly than the fine unit including shaft 12 and rotor windings 30, 32.

With reference to FIG. 2:

$\theta_2 = \theta_1 G_1/G_2$ where $G_1, G_2$ equal the number of teeth on the respective gears 14, 20 and $\theta_1, \theta_2$ equal the angle of rotation of the shafts 12, 18 respectively. If an excitation voltage of amplitude E is impressed on winding 24, then:

$$E_{30} = E \cos \theta_1$$

$$E_{32} = E \sin \theta_1$$

where $E_{30}$, $E_{32}$ are the output voltages on windings 30, 32 respectively. Since these output voltages $E_{30}$, $E_{32}$ are the excitation voltages impressed on stator windings 36, 38, respectively, it follows that:

$$E_{44} = E (\cos \theta_1 \cos \theta_2 + \sin \theta_1 \sin \theta_2)$$

$$E_{44} = E \cos (\theta_1 - \theta_2)$$

$$E_{46} = E (\cos \theta_1 \sin \theta_2 - \sin \theta_1 \cos \theta_2)$$

$$E_{46} = E \sin (\theta_1 - \theta_2)$$

Therefore, $$E_{46} = E \sin [\theta_1 - (\theta_1 \frac{G_1}{G_2})]$$

$$E_{46} = E \sin [\theta_1 (1 - \frac{G_1}{G_2})]$$

If $G_1:G_2$ is 99/100, then:

$$E_{46} = E \sin [\theta_1 (1 - \frac{99}{100})]$$

$$E_{46} = E \sin (0.01 \theta_1).$$

Similarly, $E_{44} = E \cos (0.01 \theta_1)$.

Hence, the output voltages $E_{44}$ and $E_{46}$ are identical with voltages that might have been obtained from a resolver coupled to a shaft rotating at one-one hundredths of the speed of shaft 12. This enables the control system to distinguish 100 separate revolutions of the shaft 12 in a known manner as shown, for example, in the previously mentioned U.S. Pat. No. 2,735,971.

Figure 3:
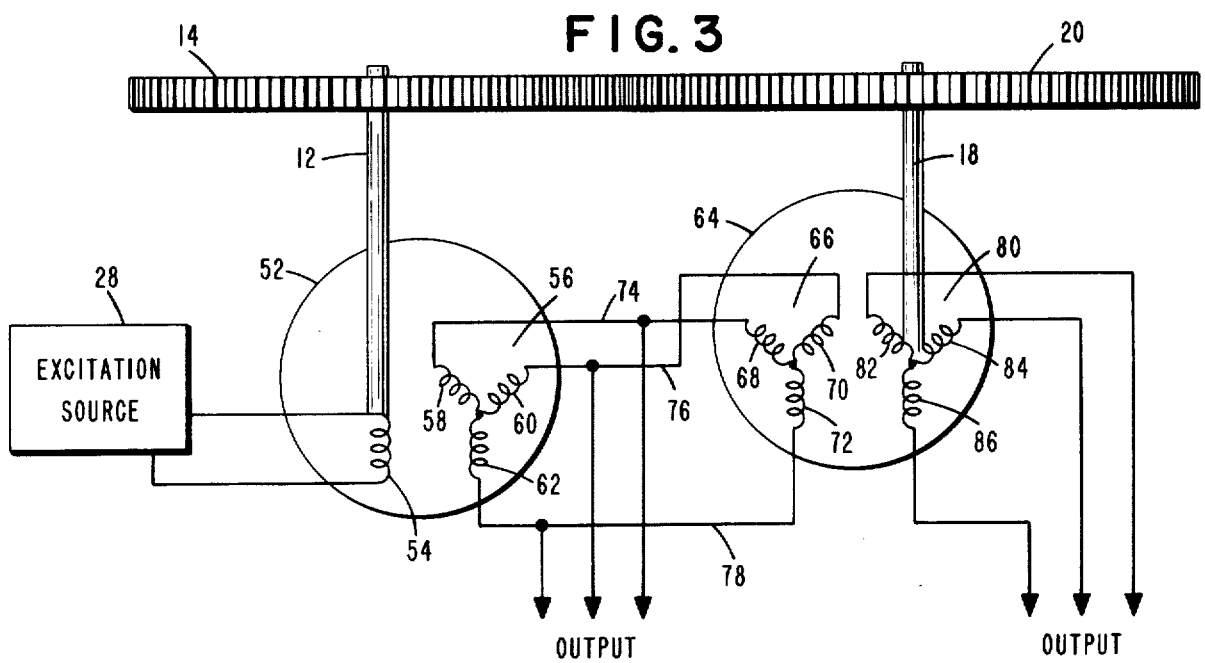
FIG. 3 illustrates, schematically, a second embodiment using synchro transducers.

In the alternative embodiment of FIG. 3, there are shown synchro transducers which may be used for the transducers of FIG. 1. A synchro transmitter 52 has a rotor winding 54 electrically connected to excitation source 28 and mechanically coupled to shaft 12. Synchro transmitter 52 also comprises a stator 56 having three windings 58, 60, 62.

A synchro differential 64 includes a stator 66 having three windings 68, 70, 72 electrically connected to stator windings 58, 60, 62 of transmitter 52 via lines 74, 76, 78. Synchro differential 64 also includes a rotor winding 80, having three windings 82, 84, 86, which are mechanically coupled to shaft 18.

As with the resolvers 22, 34, the synchro transducers 52, 64 will provide information as to a fine and coarse setting, respectively, for purposes of resolving movement of the tool to the degree desired. This is accomplished with the output voltages on the windings of stator 56 and rotor 80.

What is claimed is:

1. In a two-speed control system, apparatus for generating two-speed position signals, comprising:
   a. first and second rotatable shafts;
   b. mechanical means coupling said second shaft to said first shaft and causing the angle of rotation of said second shaft to be linearly proportional but unequal to the angle of rotation of said first shaft;
   c. a first transducer mechanically coupled to said first shaft and producing a plurality of first output voltages indicative of the angle of rotation of said first shaft;
   d. a second transducer mechanically coupled to said second shaft and having its input electrically coupled to the output of said first transducer, said second transducer being excited by said first output voltages and producing a plurality of second output voltages indicative of the difference between the respective angles of rotation of said first and second shafts.

2. The apparatus of claim 1 wherein said mechanical means coupling said second shaft to said first shaft comprises gears in mesh.

3. The apparatus of claim 1 wherein said first and second transducers, which are mechanically coupled to said first and second shafts respectively, comprise resolvers.

4. The apparatus of claim 3 wherein said first transducer comprises a first pair of stator windings in space quadrature with each other, and a first pair of rotor windings in space quadrature with each other and mechanically coupled to said first shaft; and wherein said second transducer comprises a second pair of stator windings in space quadrature with each other, and a second pair of rotor windings in space quadrature with each other and mechanically coupled to said second shaft; and wherein said second pair of stator windings are electrically coupled to said first pair of rotor windings.

5. The apparatus of claim 1 wherein said first and second transducers, which are mechanically coupled to said first and second shafts, comprise a synchro transmitter and a synchro differential respectively.

6. The apparatus of claim 5 wherein said synchro transmitter comprises a single-phase rotor winding mechanically coupled to said first shaft and electrically excited by an AC voltage source, and a first 3-phase stator winding; and wherein said synchro differential comprises a second 3-phase stator winding electrically coupled to said first 3-phase stator winding, and a 3-phase rotor winding mechanically coupled to said second shaft.

7. In a two-speed control system, apparatus comprising:
 a. first and second rotatable shafts;
 b. a first gear connected to said first shaft, and a second gear connected to said second shaft and in mesh with said first gear;
 c. a first transducer mechanically coupled to said first rotatable shaft, and electrically excited by a voltage source;
 d. a second transducer mechanically coupled to said second rotatable shaft, said second transducer being electrically coupled in cascade with said first transducer.

* * * * *